United States Patent
Liu et al.

(10) Patent No.: US 12,119,749 B2
(45) Date of Patent: Oct. 15, 2024

(54) FLYBACK CONVERTER, CONSTANT-CURRENT CONTROL METHOD, AND LIGHTING SYSTEM

(71) Applicant: Joulwatt Technology Co., Ltd., Hangzhou (CN)

(72) Inventors: Guoqiang Liu, Hangzhou (CN); Yingyan He, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 248 days.

(21) Appl. No.: 17/974,437

(22) Filed: Oct. 26, 2022

(65) Prior Publication Data
US 2023/0129443 A1  Apr. 27, 2023

(30) Foreign Application Priority Data
Oct. 26, 2021 (CN) .......................... 202111245668.9

(51) Int. Cl.
*H02M 3/335* (2006.01)
(52) U.S. Cl.
CPC .............................. *H02M 3/33507* (2013.01)
(58) Field of Classification Search
CPC ................................................. H02M 3/33507
See application file for complete search history.

(56) References Cited

U.S. PATENT DOCUMENTS

| | | | |
|---|---|---|---|
| 2018/0301974 A1* | 10/2018 | Lin | H02M 1/38 |
| 2020/0267812 A1* | 8/2020 | Deng | H05B 45/37 |
| 2023/0080559 A1* | 3/2023 | Song | H02M 1/0009 363/21.02 |

* cited by examiner

*Primary Examiner* — Rafael O De Leon Domenech
(74) *Attorney, Agent, or Firm* — Bayramoglu Law Offices LLC (57) ABSTRACT

A flyback converter, a constant-current control method, and a lighting system are provided. The constant-current control method includes: sampling a loop current in a resonant loop to obtain a first sampling signal; obtaining zero crossing time of an excitation current in the resonant loop; and turning off a first switch tube when the first sampling signal reaches a reference value, and turning off a second switch tube after the zero crossing time of the excitation current in the resonant loop to control an average value of the excitation current to keep constant. The present disclosure can achieve a constant average value of an excitation current in each switching cycle based on a loop current in a resonant loop on the primary side of the converter, thereby realizing constant-current control of an output current of the converter.

20 Claims, 5 Drawing Sheets

FIG. 1

(Prior Art)

FLYBACK CONVERTER, CONSTANT-CURRENT CONTROL METHOD, AND LIGHTING SYSTEM

CROSS REFERENCE TO THE RELATED APPLICATIONS

This application is based upon and claims priority to Chinese Patent Application No. 202111245668.9, filed on Oct. 26, 2021, the entire contents of which are incorporated herein by reference.

TECHNICAL FIELD

The present disclosure relates to the technical field of switching power supply, specifically, to a flyback converter, a constant-current control method, and a lighting system.

BACKGROUND

With the trend of global warming and continuous reduction of earth resources in recent years, the energy crisis has gradually become one of concerns. Electric energy consumed in buildings every year is huge, and lighting in buildings is one of the main causes of electric energy consumption. How to improve lighting efficiency is the main problem at present.

In recent years, a light-emitting diode (LED) has gradually become a mainstream light source due to its high efficiency. In addition, owing to its unique physical structure and optical and electrical characteristics, the LED has great advantages over other traditional light sources. A LED driver plays a very important role in controlling energy efficiency, so system efficiency can be further improved by properly optimizing the circuit of the driver. A traditional LED drive system controls LED based on a single-stage driver or a multi-stage driver system. The single-stage LED driver is a DC/DC converter with a constant output current and can realize power factor correction (PFC). The multi-stage driver system can be composed of, for example, a PFC circuit and the DC/DC converter. The PFC circuit generally adopts a BOOST topology and is used as a front stage to provide a stable output voltage (such as 400 V) as an input of a rear stage, and the DC/DC converter is used as the rear stage to convert the output voltage provided by the PFC circuit into a required DC output voltage. In addition, owing to the unique characteristics of the LED, the DC/DC converter always needs a current loop to achieve constant-current control.

Figure 1:
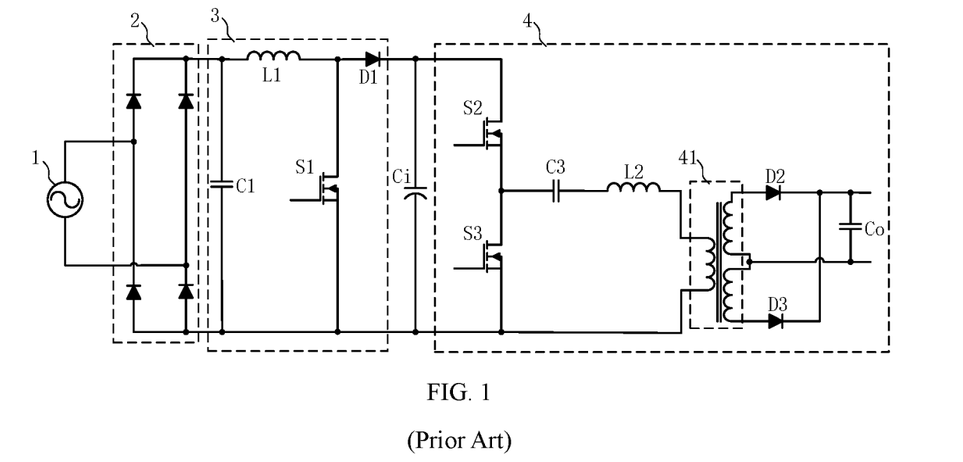
FIG. 1 is a schematic structural diagram of an existing lighting system.

At present, the main topology of the DC/DC converter includes LLC resonant converter and an asymmetric half-bridge flyback topology (AHB-flyback). FIG. 1 is a schematic structural diagram of a lighting system composed of the PFC circuit and the LLC resonant converter. In the LLC resonant converter, a resonant inductor is provided on a primary side of a transformer. Compared with an AHB-flyback converter that mainly uses a leakage inductor of a primary winding of the transformer, the LLC resonant converter has a higher hardware cost. In addition, the LLC resonant converter is a three-order system, which makes it difficult to design a compensation circuit of the LLC resonant converter and is complex to perform control. Charge control is required to achieve good loop stability, with that a sampling system is complex, which further increases the system's cost.

The AHB-flyback converter not only has low voltage stress but also can use the energy of the leakage inductor to turn on a switch tube at zero voltage, thus obtaining high efficiency. Therefore, the AHB-flyback converter is popularized. The AHB-flyback converter can also output a constant current through pulse width modulation (PWM). PWM is a very effective technique that can accurately control a current in an analog circuit. In PWM, closed-loop feedback is performed based on a load change and a difference between a controlled current and a reference current in a control circuit, and then a gate or base bias of the switch tube is adjusted by using a series of compensation circuits and drive circuits to change turn-on time of the switch tube in a switching power supply, which changes the current in the circuit. In other words, the output current can be controlled to remain constant through PWM when a working condition changes.

Most constant-current closed-loop control methods used for the AHB-flyback converter perform current sampling directly from a secondary circuit, which requires extra devices such as an optocoupler and an isolated operational amplifier. These devices have many shortcomings. For example, 1): Costs and circuit volume are increased; 2) When the optocoupler is directly used to isolate a transmitted analog quantity, it is necessary to consider the nonlinearity of the optocoupler, which greatly increases the difficulty of circuit design; 3) A transmission delay of the optocoupler is large. To ensure the accuracy of turning on and off the switch tube, the structural parameters of all circuits need to be consistent to make delays of all the circuits consistent, which also increases the difficulty of circuit design.

Therefore, it is necessary to provide an improved technical solution to overcome the above technical problems in the prior art.

SUMMARY

To resolve the above technical problems, the present disclosure provides a flyback converter, a constant-current control method, and a lighting system to achieve a constant average value of an excitation current in each switching cycle based on a loop current in a resonant loop on a primary side of a converter, thereby realizing constant-current control of an output current of the converter. The control method is simple, and a better constant current effect is achieved. In addition, it is unnecessary to add an additional resonant inductor, an optocoupler, an isolated operational amplifier, and other devices to realize voltage conversion, which can reduce costs and circuit volume.

According to a first aspect of the present disclosure, a constant-current control method for a flyback converter is provided, where the flyback converter includes a first switch tube and a second switch tube that form a half-bridge, and a first inductor, a first capacitor, and a primary winding in a transformer that form a resonant loop with the second switch tube. In each switching cycle, the constant-current control method includes:

sampling a loop current in the resonant loop to obtain a first sampling signal;

obtaining zero crossing time of an excitation current in the resonant loop; and turning off the first switch tube when the first sampling signal reaches a reference value and turning off the second switch tube after the zero crossing time of the excitation current to control an average value of the excitation current to keep constant.

Optionally, the reference value is a preset fixed value.

Optionally, the reference value is an error signal generated according to feedback of the loop current.

Optionally, turning off the first switch tube when the first sampling signal reaches a reference value includes:
disposing a first current source, a second current source, and a third current source to charge a second capacitor to obtain the error signal at both ends of the second capacitor; and
comparing the first sampling signal with the error signal, and turning off the first switch tube when the first sampling signal reaches the error signal, where
the first current source injects a current into the second capacitor, the second current source and the third current source extract a current from the second capacitor in a time-sharing manner, the second current source is controlled by a first feedback signal, and the third current source is controlled by a second feedback signal.

Optionally, the first feedback signal is the first sampling signal; and
a method for obtaining the second feedback signal includes:
sampling and holding a peak value of the first sampling signal before the first switch tube is turned off to obtain a second sampling signal; and
setting a gain coefficient to perform gain processing on the second sampling signal to obtain the second feedback signal.

Optionally, the gain coefficient is 0.5.

Optionally, a method for determining the zero crossing time of the excitation current includes:
performing time integration on predetermined parameters of the flyback converter during the turn-on of the first switch tube to obtain a first integration result; and
performing time integration on the predetermined parameters of the flyback converter after the turn-on of the second switch tube to obtain a second integration result, and obtaining the zero crossing time of the excitation current when the second integration result reaches the first integration result, where
the transformer includes a primary winding, a secondary winding, and an auxiliary winding, and the predetermined parameters are voltages at both ends of any one of the windings in the transformer.

Optionally, a method for determining the zero crossing time of the excitation current includes:
charging a preset capacitor based on a current on an auxiliary winding in the transformer during the turn-on of the first switch tube; and
discharging the preset capacitor based on the current on the auxiliary winding in the transformer after the turn-on of the second switch tube, and obtaining the zero crossing time of the excitation current when voltages at both ends of the preset capacitor are lower than a preset voltage.

Optionally, turning off the second switch tube after the zero crossing time of the excitation current in the resonant loop includes:
turning off the second switch tube in preset time after the zero crossing time of the excitation current; or
turning off the second switch tube when the excitation current reaches a preset negative value.

Optionally, the constant-current control method further includes:
turning on the second switch tube after the first dead time during which the first switch tube is turned off; and
turning on the first switch tube after the second dead time during which the second switch tube is turned off or when drain-source voltages of the first switch tube are lower than a preset voltage.

According to a second aspect of the present disclosure, a flyback converter is provided, including: a transformer with a primary winding and a secondary winding;
a first switch tube and a second switch tube connected in series between an input terminal and a reference ground;
a first inductor and a first capacitor connected to the primary winding and the second switch tube to form a resonant loop;
a current sampling unit connected to the resonant loop and configured to sample a loop current in the resonant loop to obtain a first sampling signal;
a zero crossing detection unit configured to obtain zero crossing time of an excitation current in the resonant loop; and
a control circuit connected to the control terminals of the first switch tube and the second switch tube and configured to control turn-on states of the first switch tube and the second switch tube, where
the control circuit is connected to the current sampling unit and the zero crossing detection unit to turn off the first switch tube when the first sampling signal reaches a reference value and turn off the second switch tube after the zero crossing time of the excitation current in the resonant loop to control an average value of the excitation current to keep constant.

Optionally, the control circuit is further configured to turn on the second switch tube after the first dead time during which the first switch tube is turned off; and
turn on the first switch tube after the second dead time during which the second switch tube is turned off or when drain-source voltages of the first switch tube are lower than a preset voltage.

Optionally, the control circuit includes:
a first turn-on triggering signal generating module configured to generate a turn-on triggering signal of the first switch tube based on the drain-source voltages of the first switch tube or to generate a turn-on triggering signal of the first switch tube based on a turn-off triggering signal of the second switch tube and the second dead time;
a first turn-off triggering signal generating module configured to generate a turn-off triggering signal of the first switch tube based on the first sampling signal and the reference value;
a second turn-on triggering signal generating module configured to generate a turn-on triggering signal of the second switch tube based on the turn-off triggering signal of the first switch tube and the first dead time; and
a second turn-off triggering signal generating module configured to generate the turn-off triggering signal of the second switch tube based on the zero crossing time of the excitation current.

Optionally, the control circuit further includes:
a first reset-set (RS) trigger, where a reset terminal is connected to an output terminal of the first turn-off triggering signal generating module, and a set terminal is connected to an output terminal of the first turn-on triggering signal generating module;
a first driver connected between an output terminal of the first RS trigger and the control terminal of the first switch tube;

a second RS trigger, where a reset terminal is connected to an output terminal of the second turn-off triggering signal generating module, and a set terminal is connected to an output terminal of the second turn-on triggering signal generating module; and a second driver connected between an output terminal of the second RS trigger and the control terminal of the second switch tube.

Optionally, the reference value is a preset fixed value.

Optionally, the reference value is an error signal generated according to feedback of the loop current.

Optionally, the first turn-off triggering signal generating module includes:

an error signal generating unit configured to generate the error signal based on a first feedback signal and a second feedback signal; and a comparison unit with a normal-phase input terminal for receiving the error signal, a reverse-phase input terminal for receiving the first sampling signal, and an output terminal for outputting the turn-off triggering signal of the first switch tube.

Optionally, the error signal generating unit includes:

a first current source and a second capacitor connected between a power supply terminal and a ground terminal, where the first current source is configured to inject a current into an intermediate node between the first current source and the second capacitor;

a second current source and a first switch connected between the intermediate node and the ground terminal, where the second current source extracts a current from the intermediate node when the first switch is turned on;

a third current source and a second switch connected between the intermediate node and the ground terminal, where the third current source extracts a current from the intermediate node when the second switch is turned on;

a selection unit configured to generate, based on a control signal of the first switch tube and the zero crossing time of the excitation current, a first selection signal and a second selection signal that are inverted from each other, control the first switch to be turned on when the first selection signal is effective, and control the second switch to be turned on when the second selection signal is effective; and a feedback signal generating unit configured to generate the first feedback signal and the second feedback signal based on the first sampling signal; where the second current source is a voltage-controlled current source controlled by the first feedback signal, the third current source is a voltage-controlled current source controlled by the second feedback signal, and the first current source, the second current source, and the third current source jointly charge the second capacitor to generate the error signal at both ends of the second capacitor.

Optionally, the feedback signal generating unit includes:

a sampling and holding unit configured to sample and hold a peak value of the first sampling signal before the first switch tube is turned off to obtain a second sampling signal; and a voltage gain unit configured to perform gain processing on the second sampling signal based on a gain coefficient to obtain the second feedback signal, where the first feedback signal is the first sampling signal sampled by the current sampling unit in real-time.

Optionally, the gain coefficient is 0.5.

According to a third aspect of the present disclosure, a lighting system is provided, including: a rectifying circuit configured to rectify an input alternating current (AC) power supply to output a first voltage signal;

a PFC circuit connected to the rectifying circuit and configured to perform PFC on the first voltage signal and output a second voltage signal; and the above-described flyback converter configured to drive a LED load at a constant current.

The present disclosure has the following beneficial effects: According to the flyback converter, the constant-current control method, and the lighting system provided in the present disclosure, in each switching cycle of the converter, the first switch tube is turned off when the loop current in the resonant loop on the primary side reaches the reference value, and the second switch tube is turned off at the zero crossing time of the excitation current, such that maximum and minimum values of the excitation current are constant when the excitation current changes. This further achieves the constant average value of the excitation current in each switching cycle, which is equivalent to realize constant-current control of an output current of the converter. The control method is simple, and a better constant current effect is achieved. In addition, it is unnecessary to add an additional resonant inductor, an optocoupler, an isolated operational amplifier, and other devices to realize voltage conversion, which can reduce costs and circuit volume.

It should be noted that the above general description and the following detailed description are only exemplary and explanatory and should not be construed as a limitation to the present disclosure.

DETAILED DESCRIPTION OF THE EMBODIMENTS

To facilitate the understanding of the present disclosure, the present disclosure is described more completely below with reference to the accompanying drawings. Preferred embodiments of the present disclosure are shown in the accompanying drawings. However, the present disclosure can be embodied in various forms without being limited to the embodiments set forth herein. On the contrary, these embodiments are provided to explain the present disclosure more thoroughly and comprehensively.

Figure 2:
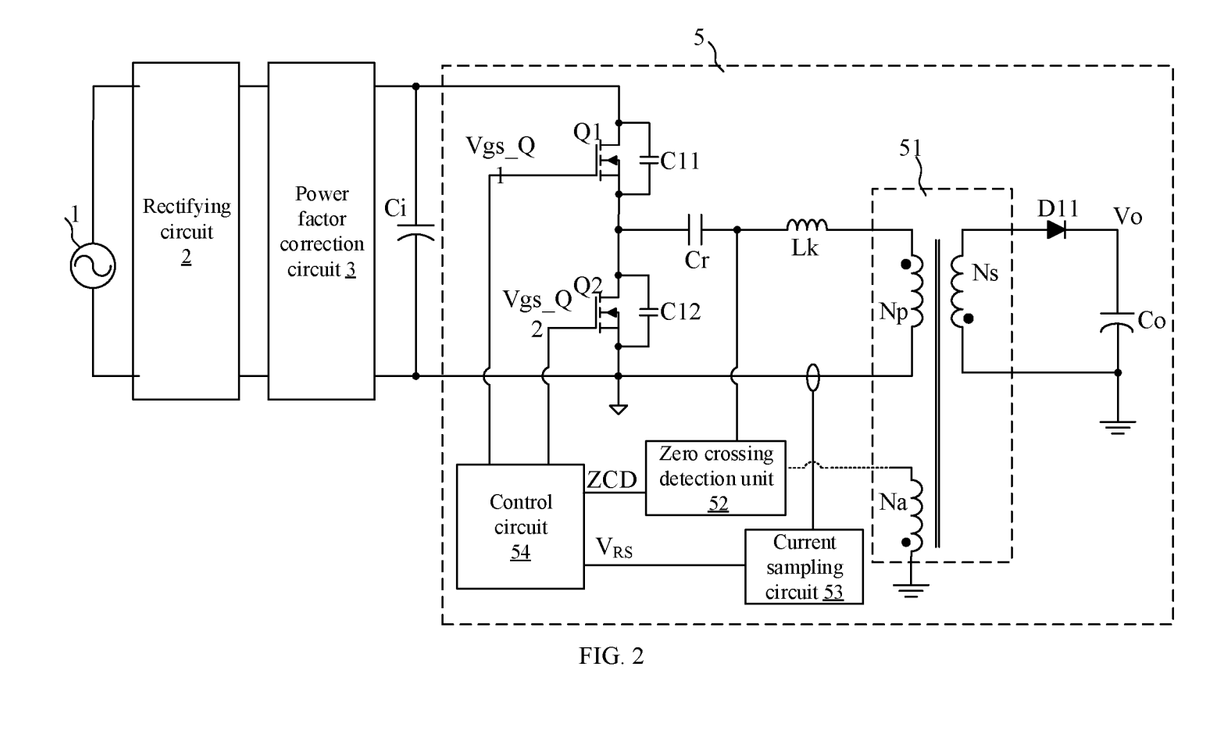
FIG. 2 is a schematic structural diagram of a lighting system according to an embodiment of the present disclosure.

As shown in FIG. 2, a lighting system according to an embodiment of the present disclosure includes: AC power supply 1, rectifying circuit 2, PFC circuit 3, and flyback converter 5.

The rectifying circuit 2 is configured to rectify an AC power supply input by the AC power supply 1 to output a first voltage signal to the PFC circuit 3. Optionally, the rectifying circuit 2 may be a full-bridge rectifying circuit or a half-bridge rectifying circuit.

The PFC circuit 3 is connected to the rectifying circuit 2 and configured to perform PFC on the first voltage signal output by the rectifying circuit 2 and output a second voltage signal. The PFC circuit 3 generally adopts a BOOST topology and is used as a front stage and provides a stable second voltage signal (such as 400 V) based on a rectified first voltage signal as an input of a rear-stage circuit such as the flyback converter 5.

The flyback converter 5 is connected to an LED load and configured to provide a driving current for the LED load to drive the LED load. In this embodiment, the flyback converter 5 is configured to drive the LED load at a constant current.

In the present disclosure, the flyback converter 5 is, for example, an AHB-flyback converter and includes transformer 51 with primary winding Np and secondary winding Ns, first switch tube Q1 and second switch tube Q2 that are connected in series between an input terminal and a reference ground to form a half-bridge, first inductor Lk, first capacitor Cr, zero crossing detection unit 52, current sampling unit 53, and control circuit 54.

A drain of the first switch tube Q1 is connected to the input terminal to receive the second voltage signal, and a gate of the first switch tube Q1 is connected to the control circuit 54. A drain of the second switch tube Q2 is connected to a source of the first switch tube Q1, a source of the second switch tube Q2 is connected to the reference ground, and a gate of the second switch tube Q2 is connected to the control circuit 54. Capacitors C11 and C12 are junction capacitors of the first switch tube Q1 and the second switch tube Q2 respectively. In the same switching cycle, the first switch tube Q1 and the second switch tube Q2 are turned on in a time-sharing manner to transmit the second voltage signal from the primary side of the transformer 51 to the secondary side. In a possible embodiment, both the first switch tube Q1 and the second switch tube Q2 are negative channel metal oxide semiconductor (NMOS) field effect transistors.

The first inductor Lk, the first capacitor Cr, the primary winding Np, and the second switch tube Q2 are connected to form a resonant loop. One terminal of the first inductor Lk is connected to the drain of the second switch tube Q2 through the first capacitor Cr, the other terminal of the first inductor Lk is connected to a dotted terminal of the primary winding Np, and an opposite-polarity terminal of the primary winding Np is connected to the source of the second switch tube Q2. In a possible embodiment, the first inductor Lk is a leakage inductor of the primary winding Np, and the first capacitor Cr is a resonant capacitor.

The secondary side of the flyback converter 5 includes: rectifier diode D1 and output capacitor Co. An anode of the rectifier diode D1 is connected to the opposite-polarity terminal of the secondary winding Ns, and a cathode of the rectifier diode D1 is connected to an output terminal of the flyback converter 5. A positive terminal of the output capacitor Co is connected to the output terminal of the flyback converter 5, a negative terminal of the output capacitor Co is connected to the reference ground, and a dotted terminal of the secondary winding Ns is also connected to the reference ground. Further, the output terminal of the flyback converter 5 is connected to a load, and the load receives electric energy (such as a voltage and a current) converted by the flyback converter 5. In some examples, the electric energy converted by the flyback converter 5 passes through a filter before reaching the load. In some examples, the filter is a subcomponent of the flyback converter 5, an external component of the flyback converter 5, and/or a subcomponent of the load. In any case, the load can use filtered or unfiltered electric energy from the flyback converter 5 to perform a function. Optionally, the load may include, but is not limited to, a computing device and a related component, such as a microprocessor, an electrical component, a circuit, a laptop, a desktop computer, a tablet computer, a mobile phone, a battery, a speaker, a lighting unit such as a LED, an automotive/marine/aviation/train related component, a motor, a transformer, or any other type of electrical device and/or circuit that receives the voltage or the current from the flyback converter.

The current sampling unit 53 is connected to the resonant loop and configured to sample a loop current (denoted as $I_{Lr}$) in the resonant loop to obtain a first sampling signal $V_{RS}$. In an exemplary embodiment of the present disclosure, the current sampling unit 53 includes sampling resistor RS connected in series in the resonant loop, and the current sampling unit 53 obtains voltages at both ends of the sampling resistor RS through sampling as the first sampling signal $V_{RS}$, thereby equivalently representing the loop current $I_{Lr}$ in the resonant loop. In addition, it can be understood that in other embodiments of the present disclosure, another conventional current sampling structure can also be used to sample the loop current $I_{Lr}$ in the resonant loop, which is not limited to the present disclosure.

The zero crossing detection unit 52 is configured to obtain the zero crossing time of an excitation current (denoted as $I_{Lm}$) in the resonant loop.

For example, in a possible embodiment of the present disclosure, the zero crossing detection unit 52 is provided with an integration circuit and a comparison circuit. In each switching cycle, the integration circuit is configured to separately perform time integration on predetermined parameters of the flyback converter 5 during the turn-on of the first switch tube Q1 and turn-on of the second switch tube Q2 to obtain a corresponding first integration result and a corresponding second integration result. In this case, the first integration result and the second integration result may correspond to a voltage signal output by the integration circuit. The comparison circuit is configured to compare the first integration result with the second integration result and obtain the zero crossing time ZCD of the excitation current $I_{Lm}$ at a time point when the second integration result is the same as the first integration result.

Based on the working principle of the transformer 51, it can be known that there is a certain proportional relationship between the voltages at both ends of the primary winding Np and between voltages at both ends of the secondary winding Ns in the transformer 51. Even when the transformer 51 is provided with an auxiliary winding Na, there is a certain proportional relationship between the voltages at both ends of the primary winding Np, between the voltages at both ends of the secondary winding Ns, and between voltages Vaux at both ends of the auxiliary winding Na in the transformer 51. Further, in some embodiments, the predetermined parameters when the zero crossing detection unit 52 performs time integration are voltages at both ends of any winding in the transformer 51, as shown in FIG. 2. For example, the predetermined parameters are the voltages at both ends of the auxiliary winding N. In this case, the predetermined parameters can be directly or indirectly sampled by the zero crossing detection unit 52. Optionally, the voltages at both ends of the auxiliary winding Na may be sampled by the zero crossing detection unit 52 after resistive subdivision or may be directly sampled by the zero crossing detection unit 52.

In another possible embodiment of the present disclosure, the zero crossing detection unit 52 is provided with a preset capacitor. In each switching cycle, the zero crossing detection unit 52 charges the preset capacitor based on a current on the auxiliary winding Na in the transformer 51 during the turn-on of the first switch tube Q1. After the second switch tube Q2 is turned on, the zero crossing detection unit 52 discharges the preset capacitor based on the current on the auxiliary winding Na in the transformer 51. Moreover, the zero crossing detection unit 52 is also provided with a corresponding voltage detection unit to detect voltages at both ends of the preset capacitor in real-time after the second switch tube Q2 is turned on and obtain the zero crossing time ZCD of the excitation current $I_{Lm}$ when the voltages at both ends of the preset capacitor are detected to be lower than a preset voltage.

The control circuit 54 is connected to the control terminals of the first switch tube Q1 and the second switch tube Q2 to control the turn-on states of the first switch tube Q1 and the second switch tube Q2.

In the present disclosure, the control circuit 54 is also connected to the current sampling unit 53 and the zero crossing detection unit 52 to turn off the first switch tube Q1 when the first sampling signal VRS reaches a reference value and turn off the second switch tube Q2 after the zero crossing time ZCD of the excitation current $I_{Lm}$ in the resonant loop (for example, start timing at the zero crossing time ZCD of the excitation current $I_{Lm}$ in the resonant loop, and turn off the second switch tube Q2 when a timing value reaches a preset time parameter, or turn off the second switch tube Q2 when the excitation current $I_{Lm}$ reaches a preset negative value to facilitate subsequent zero-voltage turn-on of the first switch tube Q1) to control an average value of the excitation current $I_{Lm}$ to keep constant in each switching cycle.

In a switching cycle, if the dead time between the turn-on of the first switch tube Q1 and the turn-on of the second switch tube transistor Q2 is ignored, an average voltage on the primary winding Np of the converter is 0 when the converter is in a steady state, and then the following formula is satisfied:

$$VC=VS=D*Vin \qquad (1)$$

In the above formula, VC represents voltages at both ends of the first capacitor Cr, VS represents voltages at both ends of a diode D11 on the secondary side of the converter, D represents a duty cycle of a control signal of the first switch tube Q1 of the converter, and Vin represents an input voltage of the converter.

When the first switch tube Q1 is turned on and the second switch tube Q2 is turned off, the inductance value of the first inductor Lk is far less than the inductance value (denoted as Lm) of the primary winding Np. Therefore, the leakage inductance of the primary winding Np is ignored. In this case, the following formula is satisfied:

$$VLM1=Vin-VC-D*Vin=(1-D)*Vin \qquad (2)$$

In the above formula, VLM1 represents voltage values at both ends of the primary winding Np of the converter during the turn-on of the first switch tube Q1.

When the first switch tube Q1 is turned off and the second switch tube Q2 is turned on, the first inductor Lk and the first capacitor Cr resonate. Therefore, the leakage inductance of the primary winding Np cannot be ignored in this process. In this case, the following formula is satisfied:

$$VLM2=N*Vo \qquad (3)$$

In the above formula, VLM1 represents voltage values at both ends of the primary winding Np of the converter during the turn-off of the first switch tube Q1. Vo represents the output voltage of the converter.

The following formula can be obtained through volt-second balance:

$$VLM1*Ton=VLM2*Toff \qquad (4)$$

In the above formula, Ton represents the turn-on time of the first switch tube Q1 in a switching cycle, and Toff represents the turn-off time of the first switch tube Q1 in a switching cycle.

Further, the following formula can be obtained by combining formula (2), formula (3), and formula (4):

$$(1-D)*Vin*Ton=N*Vo*Toff \qquad (5)$$

The following formula is obtained by transforming formula (5) based on the relationship between values of Ton and Toff:

$$(1-D)*D*Vin=N*Vo*(1-D) \qquad (6)$$

In other words, $$N*Vo=D*Vin \qquad (7)$$

Based on formula (7), the above AHB-flyback converter has a similar input-output relationship to a buck topology. Further, in the present disclosure, the average value of the excitation current $I_{Lm}$ can be used to represent the output current Io of the converter equivalently, that is, the average value of the excitation current $I_{Lm}$ in each switching cycle is controlled to be constant to equivalently make the output current Io of the converter constant, thereby realizing constant-current control.

In the present disclosure, a maximum value (namely, peak value) of the loop current $I_{Lr}$ of the converter can be controlled to be constant in each switching cycle by turning off the first switch tube Q1 when the first sampling signal $V_{RS}$ reaches the reference value. In addition, because the loop current $I_{Lr}$ and the excitation current $I_{Lm}$ in the resonant loop of the converter have the same current and current waveform during the turn-on of the first switch tube Q1 in each switching cycle, a maximum value (namely, peak value) of the excitation current $I_{Lm}$ of the converter can also be controlled to be constant in each switching cycle by turning off the first switch tube Q1 when the first sampling signal $V_{RS}$ reaches the reference value. In addition, the minimum value of the excitation current $I_{Lm}$ of the converter can be controlled to be constant in each switching cycle by turning off the second switch tube Q2 after the zero crossing time ZCD of the excitation current $I_{Lm}$ in the resonant loop. In this way, the average value of the excitation current $I_{Lm}$ can be controlled to be constant in each switching cycle, which is equivalent to realize constant-current control of the output current of the converter.

Further, the control circuit 54 is further configured to turn on the second switch tube Q2 after the first dead time during which the first switch tube Q1 is turned off and configured to turn on the first switch tube Q1 after the second dead time during which the second switch tube Q2 is turned off or when drain-source voltages of the first switch tube Q1 are 0 V.

Figure 3:
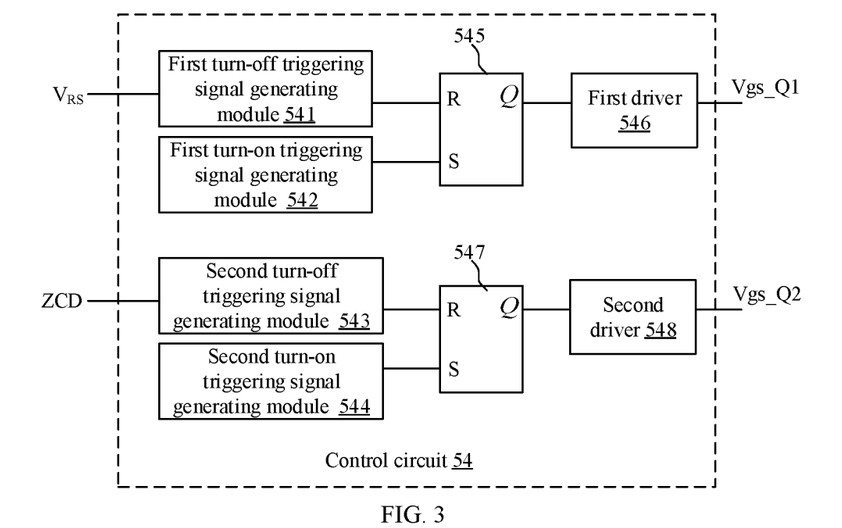
FIG. 3 is a schematic structural diagram of a control circuit according to an embodiment of the present disclosure.

Referring to FIG. 3, in this embodiment, the control circuit 54 includes: first turn-off triggering signal generating module 541, first turn-on triggering signal generating module 542, second turn-off triggering signal generating module 543, and second turn-on triggering signal generating module 544.

The first turn-on triggering signal generating module 542 is configured to generate a turn-on triggering signal of the first switch tube Q1 based on the drain-source voltages of the first switch tube Q1 or to generate a turn-on triggering signal of the first switch tube Q1 based on a turn-off triggering signal of the second switch tube Q2 and the second dead time. Optionally, the first turn-on triggering signal generating module 542 may be provided with a voltage sampling unit. The voltage sampling unit is configured to sample and detect the drain-source voltages of the first switch tube Q1. When the time at which it is detected that the drain-source voltages of the first switch tube Q1 decrease to a low voltage from a high level, the voltage sampling unit is configured to generate the triggering signal for controlling the turn-on of the first switch tube Q1. In this embodiment, when it is detected that the drain-source voltages of the first switch tube Q1 decreases from the high level to lower than a preset low voltage, it is deemed that the time at which the drain-source voltages of the first switch tube Q1 decrease from high level to zero voltage is detected. Optionally, the first turn-on triggering signal generating module 542 may also be provided with a first delaying unit or a first timing unit and is configured to generate, after receiving the turn-off triggering signal of the second switch tube Q2 and delaying the second dead time, the triggering signal for controlling the turn-on of the first switch tube Q1.

It should be noted that the present disclosure does not limit the sampling position of the voltage sampling unit in the first turn-on triggering signal generating module 542, provided that the drain-source voltages of the first switch tube Q1 can be sampled.

The second turn-on triggering signal generating module 544 is configured to generate a turn-on triggering signal of the second switch tube Q2 based on a turn-off triggering signal of the first switch tube Q1 and the first dead time. In this embodiment, the second turn-on triggering signal generating module 544 is provided with a second delaying unit or a second timing unit, and the second turn-on triggering signal generating module 544 is connected to the first turn-off triggering signal generating module 541. After receiving the turn-off triggering signal of the first switch tube Q1 and delaying the first dead time, the second turn-on triggering signal generating module 544 generates the triggering signal for controlling the turn-on of the second switch tube Q2.

the second turn-off triggering signal generating module 543 is configured to generate the turn-off triggering signal of the second switch tube Q2 based on the zero crossing time ZCD of the excitation current $I_{Lm}$. In this embodiment, the second turn-off triggering signal generating module 543 is connected to the zero crossing detection unit 52. Optionally, when the zero crossing time ZCD of the excitation current $I_{Lm}$ is detected by the zero crossing detection unit 52, the second turn-off triggering signal generating module 543 can be directly triggered to generate the triggering signal for controlling the turn-off of the second switch tube Q2. Alternatively, the second turn-off triggering signal generating module 543 may be provided with a third delaying unit or a third timing unit. After the zero crossing time ZCD of the excitation current $I_{Lm}$ is detected by the zero crossing detection unit 52, the third delaying unit or the third timing unit is triggered to start timing. The second turn-off triggering signal generating module 543 can generate, when a timing value reaches a preset time value, the triggering signal for controlling the turn-off of the second switch tube Q2 or generate, when the excitation current $I_{Lm}$ reaches the preset negative value, the triggering signal for controlling the turn-off of the second switch tube Q2 to facilitate the subsequent zero-voltage turn-on of the first switch tube Q1.

The first turn-off triggering signal generating module 541 is configured to generate a turn-off triggering signal of the first switch tube Q1 based on the first sampling signal $V_{RS}$ and the reference value.

Figure 5:
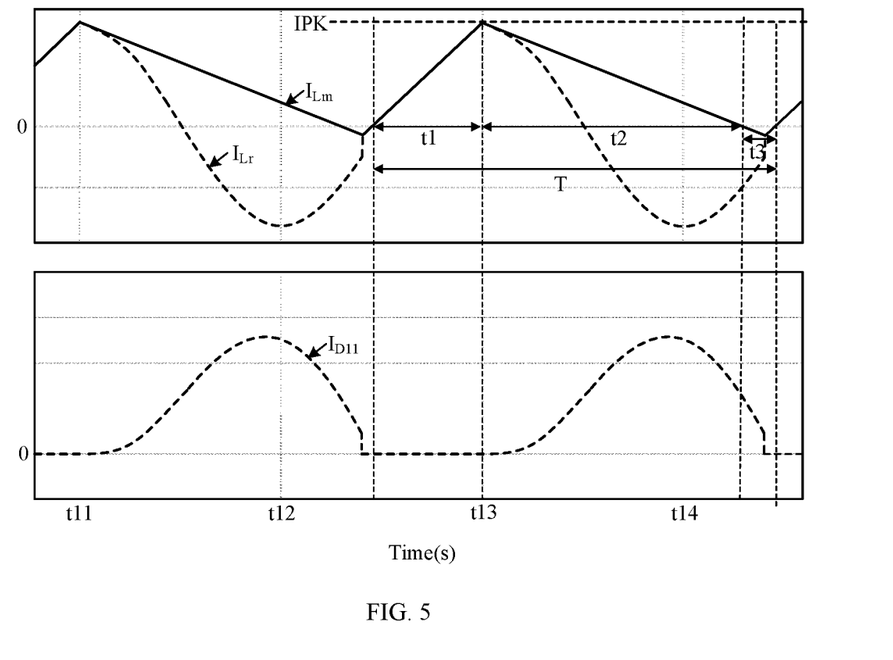
FIG. 5 is a schematic timing waveform diagram of each current when a flyback converter is in a steady state according to an embodiment of the present disclosure.

In a first embodiment of the present disclosure, the reference value is a preset fixed value. It can be understood that the solution in this embodiment is only used to achieve rough constant-current control. Referring to FIG. 5, the peak value IPK of the excitation current $I_{Lm}$ is controlled to be fixed in each switching cycle to achieve the constant average value of the excitation current $I_{Lm}$ in each switching period, and thus equivalently realize constant-current control of the output current Io of the flyback converter 5. In the solution of this embodiment, since a negative-value part of the excitation current $I_{Lm}$ is not considered but the excitation current $I_{Lm}$ is approximated to a nonnegative-value triangular wave signal for processing in a switching cycle, the average value of the excitation current $I_{Lm}$ is 0.5*IPK, in other words, the output current Io of the flyback converter 5 is roughly equivalent to 0.5*IPK*Nps. IPK represents the preset fixed reference value, and Nps represents a coil turn ratio of the primary winding Np and the secondary winding Ns in the transformer 51. In this way, in the constant current solution shown in this embodiment, a control mode is simple, and only a few signals are sampled in a process of outputting a constant current (only the loop current $I_{Lr}$ in the resonant loop is sampled). Therefore, it is easier to implement the constant current solution in this embodiment, and the cost is lower.

It can be understood that in FIG. 5, a solid line represents a waveform of the excitation current $I_{Lm}$, a dotted line represents a waveform of the loop current $I_{Lr}$, and the solid line and the dotted line overlap, such as a waveform in a time period t1. The overlapping part indicates that the excitation current $I_{Lm}$ and the loop current $I_{Lr}$ have the same signal waveform, namely, the same current in this time period, in other words, the excitation current $I_{Lm}$ and the loop current $I_{Lr}$ have a maximum value or peak value. In FIG. 5, $I_{D11}$ represents a current waveform on the diode D11 on the secondary side of the converter, which is a difference between the excitation current $I_{Lm}$ and the loop current $I_{Lr}$.

Figure 6:
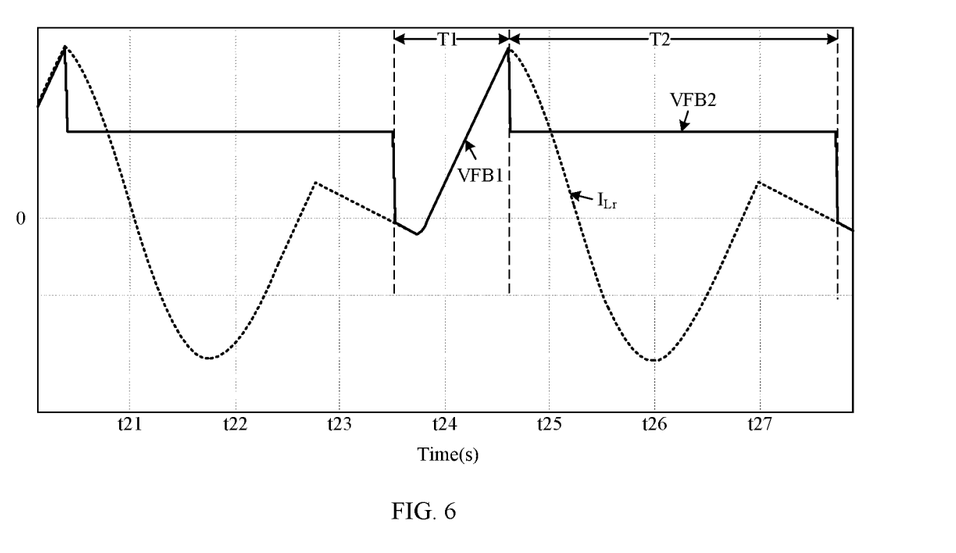
FIG. 6 is a schematic timing waveform diagram of some signals in a closed-loop current sampling circuit of a flyback converter according to an embodiment of the present disclosure.

In a second embodiment of the present disclosure, the above reference value is an error signal generated according to feedback of the loop current $I_{Lr}$ of the resonant loop. It should be noted that, in FIG. 6, the solution in this embodiment can realize accurate constant-current control. Specifically, within a first time period T1 of each switching cycle (including the entire turn-on time of the first switch tube Q1, for example, from the zero crossing time ZCD of the excitation current $I_{Lm}$ to the time at which the first switch tube Q1 is turned off), the first sampling signal $V_{RS}$, which represents the loop current $I_{Lr}$ in the resonant loop, sampled by the current sampling unit 53 is taken as a first feedback signal VFB1 and fed back to a closed-loop current sampling circuit in the first turn-off triggering signal generating module 541 in real-time, such that the excitation current $I_{Lm}$ is fed back in real-time. Further, within a second time period T2 of each switching cycle (including the entire turn-on time of the second switch tube Q2, for example, from the time at which the first switch tube Q1 is turned off to the zero crossing time ZCD of the excitation current $I_{Lm}$), a peak value of the first sampling signal $V_{RS}$ before the first switch tube Q1 is turned off is sampled and held, signal processing is performed on the peak value to obtain a second feedback signal VFB2, and the second feedback signal VFB2 is fed back to the closed-loop current sampling circuit in the first turn-off triggering signal generating module 541, such that the peak value of the excitation current $I_{Lm}$ is fed back. In this way, the closed-loop current sampling circuit can output the corresponding error signal based on a real-time feedback result and a peak value feedback result of the excitation current $I_{Lm}$ as a basis for controlling the turn-off of the first switch tube Q1. For example, when the first sampling signal $V_{RS}$ reaches an error signal value, the triggering signal for controlling the turn-off of the first switch tube Q1 is generated. The solution in this embodiment can feed back a total current (including the negative-value part of the excitation current $I_{Lm}$) of the excitation current $I_{Lm}$ in different time periods in one switching cycle, which achieves higher accuracy and a better constant current effect.

Figure 4:
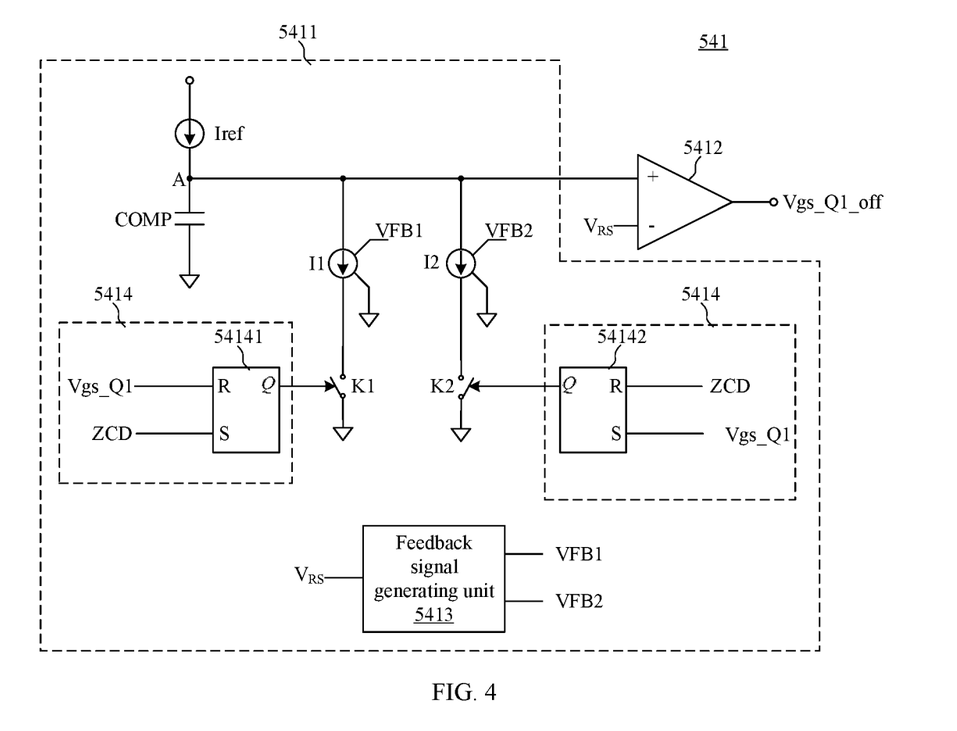
FIG. 4 is a schematic structural diagram of a first off triggering signal generating unit according to an embodiment of the present disclosure.

Specifically, referring to FIG. 4, in this embodiment, the first turn-off triggering signal generating module 541 includes error signal generating unit 5411 and comparison unit 5412.

The error signal generating unit 5411 is configured to generate the error signal based on the first feedback signal VFB1 and the second feedback signal VFB2. A normal-phase input terminal of the comparison unit 5412 receives the error signal, a reverse-phase input terminal of the comparison unit 5412 receives the first sampling signal $V_{RS}$, and an output terminal of the comparison unit 5412 outputs the turn-off triggering signal Vgs_Q1_off of the first switch tube Q1.

In this embodiment, the error signal generating unit 5411 further includes: first current source Iref, second capacitor COMP, second current source I1, first switch K1, third current source I2, second switch K2, selection unit 5414, and feedback signal generating unit 5413.

The first current source Iref and the second capacitor COMP are connected between a power supply terminal and a ground terminal, and the first current source Iref is configured to inject a current to an intermediate node A between the first current source Iref and the second capacitor COMP. The second current source I1 and the first switch K1 are connected between the ground terminal and the intermediate node A between the first current source Iref and the second capacitor COMP to form a first current path to the intermediate node A. The second current source I1 extracts a current from the intermediate node A when the first switch K1 is turned on. The third current source I2 and the second switch K2 are connected between the ground terminal and the intermediate node A between the first current source Iref and the second capacitor COMP to form a second current path to the intermediate node A. The third current source I2 extracts a current from the intermediate node A when the second switch K2 is turned on.

The feedback signal generating unit 5413 is configured to generate the first feedback signal VFB1 and the second feedback signal VFB2 based on the first sampling signal $V_{RS}$. The first feedback signal VFB1 is the first sampling signal $V_{RS}$ sampled by the current sampling unit 53 in real-time. The feedback signal generating unit 5413 further includes a sampling and holding unit and a voltage gain unit. The sampling and holding unit is configured to sample and hold the peak value of the first sampling signal $V_{RS}$ before the first switch tube Q1 is turned off to obtain a second sampling signal. The voltage gain unit is configured to perform gain processing on the second sampling signal based on a gain coefficient to obtain the second feedback signal VFB2.

In this embodiment, the gain coefficient of the voltage gain unit is 0.5.

The selection unit 5414 is configured to generate, based on the control signal Vgs_Q1 of the first switch tube Q1 and the zero crossing time ZCD of the excitation current $I_{Lm}$, a first selection signal and a second selection signal that are inverted from each other. When the first selection signal is effective (for example, the first selection signal is effective when it is at the high level), the first switch K1 can be controlled to be turned on, and when the second selection signal is effective (for example, the first selection signal is effective when it is at the high level), the second switch K2 can be controlled to be turned on such that the error signal generating unit 5411 extracts the current from the intermediate node A based on the first current path in the first time period T1 and extracts the current from the intermediate node A based on the second current path in the second time period T2.

Optionally, in an embodiment of the present disclosure, the selection unit 5414 includes RS trigger 54141 and RS trigger 54142. A reset terminal of the RS trigger 54141 receives the control signal Vgs_Q1, a set terminal of the RS trigger 54141 receives the zero crossing time ZCD of the excitation current $I_{Lm}$, and a first output terminal of the RS trigger 54141 outputs the first selection signal. A reset terminal of the RS trigger 54142 receives the zero crossing time ZCD of the excitation current $I_{Lm}$, a set terminal of the RS trigger 54142 receives the control signal Vgs_Q1, and a first output terminal of the RS trigger 54142 outputs the second selection signal. Alternatively, in another embodiment of the present disclosure, the selection unit 5414 may be provided with only one RS trigger, for example, only the RS trigger 54141. The first output terminal of the RS trigger 54141 outputs the first selection signal, and a second output terminal of the RS trigger 54141 outputs the second selection signal.

In this embodiment, the first current source Iref is a constant current source configured to provide a fixed reference current, the second current source I1 is a voltage-controlled current source controlled by the first feedback signal VFB1, and the third current source I2 is a voltage-controlled current source controlled by the second feedback signal VFB2. That is, the first feedback signal VFB1 can be used to control the capability of the second current source I1 for extracting the current from the intermediate node A to feed back the excitation current $I_{Lm}$ in real-time. The second feedback signal VFB2 can be used to control the capability of the third current source I2 for extracting the current from intermediate node A to feed back the peak value of the excitation current $I_{Lm}$. Further, the error signal generating unit 5411 generates the error signals at both ends of the second capacitor COMP by using the first current source Iref, the second current source I1, and the third current source I2 to jointly charge the second capacitor COMP.

In this embodiment, a capacitance value of the second capacitor COMP can be used as a reference for controlling the turn-off of the first switch tube Q1 and determines the turn-off time of the first switch tube Q1. Therefore, the turn-off time of the first switch tube Q1 can be adjusted by changing the capacitance value of the second capacitor COMP. In practical application, the capacitance value of the second capacitor COMP shall be set reasonably based on specific requirements.

The control circuit 54 further includes first RS trigger 545, first driver 546, second RS trigger 547, and second driver 548. A reset terminal of the first RS trigger 545 is connected to an output terminal of the first turn-off triggering signal generating module 541, a set terminal of the first RS trigger 545 is connected to an output terminal of the first turn-on triggering signal generating module 542, and an output terminal of the first RS trigger 545 is connected to the control terminal of the first switch tube Q1 through the first driver 546 to provide first control signal Vgs_Q1 to the first switch tube Q1.

A reset terminal of the second RS trigger 547 is connected to an output terminal of the second turn-off triggering signal generating module 543, a set terminal of the second RS trigger 547 is connected to an output terminal of the second turn-on triggering signal generating module 544, and an output terminal of the second RS trigger 547 is connected to the control terminal of the second switch tube Q2 through the second driver 548 to provide second control signal Vgs_Q2 to the second switch tube Q2.

The present disclosure further provides a constant-current control method for a flyback converter. The constant-current control method can be applied to the flyback converter shown in FIG. 2 to FIG. 6.

Figure 7:
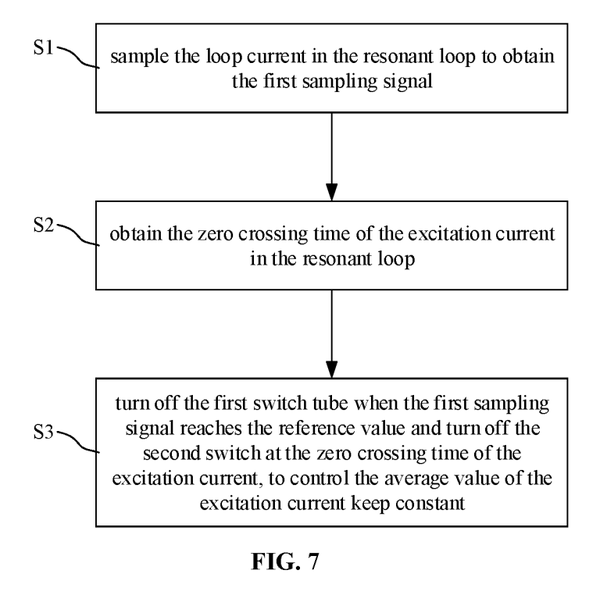
FIG. 7 is a schematic flowchart of a constant-current control method for a flyback converter according to an embodiment of the present disclosure.

As shown in FIG. 7, in each switching cycle, the constant-current control method includes the following steps.

Step S1: A loop current in a resonant loop is sampled to obtain a first sampling signal.

In this embodiment, step S1 can be specifically understood with reference to the above description of the current sampling unit S3, and details are not described herein again.

Step S2: Zero crossing time of an excitation current in the resonant loop is obtained.

In a possible embodiment of the present disclosure, a method for determining the zero crossing time of the excitation current includes: performing time integration on predetermined parameters of the flyback converter during the turn-on of a first switch tube to obtain a first integration result, performing time integration on the predetermined parameters of the flyback converter after the turn-on of a second switch tube to obtain a second integration result, and obtaining the zero crossing time of the excitation current when the second integration result reaches the first integration result. A transformer includes a primary winding, a secondary winding, and an auxiliary winding. The predetermined parameters are voltages at both ends of any one of the windings in the transformer. In another possible embodiment of the present disclosure, a method for determining the zero crossing time of the excitation current includes: charging a preset capacitor based on a current on an auxiliary winding in a transformer during the turn-on of a first switch tube, discharging the preset capacitor based on the current on the auxiliary winding in the transformer after the turn-on of a second switch tube, and obtaining the zero crossing time of the excitation current when voltages at both ends of the preset capacitor are lower than a preset voltage. Step S2 can be specifically understood with reference to the above description of the zero crossing detection unit 52, and details are not described herein again.

Step S3: The first switch tube is turned off when the first sampling signal reaches a reference value, and the second switch tube is turned off after the zero crossing time of the excitation current in the resonant loop to control an average value of the excitation current to keep constant.

In the present disclosure, optionally, turning off the second switch tube after the zero crossing time of the excitation current in the resonant loop includes: turning off the second switch tube in preset time after the zero crossing time of the excitation current; or turning off the second switch tube when the excitation current reaches a preset negative value.

In a first embodiment of the present disclosure, the reference value is a preset fixed value. It can be understood that the solution in this embodiment is only used to achieve rough constant-current control.

In a second embodiment of the present disclosure, the above reference value is an error signal generated according to feedback of the loop current $I_{Lr}$ of the resonant loop. It should be noted that the solution in this embodiment can achieve accurate constant-current control.

In the accurate constant-current control solution, the turning off the first switch tube when the first sampling signal reaches a reference value includes: disposing a first current source, a second current source, and a third current source to charge a second capacitor to obtain an error signal at both ends of the second capacitor; and comparing the first sampling signal with the error signal, and turning off the first switch tube when the first sampling signal reaches the error signal. The first current source injects a current into the second capacitor, the second current source and the third current source extract a current from the second capacitor in a time-sharing manner, the second current source is controlled by a first feedback signal, and the third current source is controlled by a second feedback signal.

Further, the first feedback signal is the first sampling signal. A method for obtaining the second feedback signal includes: sampling and holding a peak value of the first sampling signal before the first switch tube is turned off to obtain a second sampling signal and performing gain processing on the second sampling signal based on a gain coefficient to obtain the second feedback signal. In this way, the total excitation current $I_{Lm}$ can be fed back. In this embodiment, the gain coefficient is 0.5. Step S3 can be specifically understood with reference to the above description of the first turn-off triggering signal generating module 541 and the second turn-off triggering signal generating module 543, and details are not described herein again.

The constant-current control method in the present disclosure further includes: turning on the second switch tube after the first dead time during which the first switch tube is turned off and turning on the first switch tube after the second dead time during which the second switch tube is turned off or when drain-source voltages of the first switch tube are lower than a preset voltage. For specific understanding, reference can be made to the above description of the first turn-on triggering signal generating module 542 and the second turn-on triggering signal generating module 544, and details are not described herein again.

In conclusion, in each switching cycle of the converter, the present disclosure turns off the first switch tube when the loop current in the resonant loop on the primary side reaches the reference value and turns off the second switch tube at the zero crossing time of the excitation current, such that maximum and minimum values of the excitation current are constant when the excitation current changes. This further achieves the constant average value of the excitation current in each switching cycle, which is equivalent to realize constant-current control of an output current of the converter. The control method is simple, and a better constant current effect is achieved. In addition, it is unnecessary to add an additional resonant inductor, an optocoupler, an isolated operational amplifier, and other devices to realize voltage conversion, which can reduce costs and circuit volume.

Finally, it should be noted that the above embodiments are merely examples given to clearly illustrate the present disclosure and are not intended to limit the implementations. A person of ordinary skill in the art may make modifications or variations in other forms based on the above description. There is no need and no way to exhaust all the implementations. Obvious modifications or variations made thereto shall still fall within the protection scope of the present disclosure.

What is claimed is:

1. A constant-current control method for a flyback converter, wherein the flyback converter comprises a first switch tube and a second switch tube, a first inductor, a first capacitor, and a primary winding in a transformer; the first switch tube and the second switch tube form a half-bridge, the first inductor, the first capacitor, and the primary winding form a resonant loop with the second switch tube; and in each switching cycle, the constant-current control method comprises:
   sampling a loop current in the resonant loop to obtain a first sampling signal;
   obtaining a zero crossing time of an excitation current in the resonant loop; and
   turning off the first switch tube when the first sampling signal reaches a reference value and turning off the second switch tube after the zero crossing time of the excitation current to control an average value of the excitation current to keep constant.

2. The constant-current control method according to claim 1, wherein the reference value is a preset fixed value.

3. The constant-current control method according to claim 1, wherein the reference value is an error signal generated according to a feedback of the loop current.

4. The constant-current control method according to claim 3, wherein the turning off the first switch tube when the first sampling signal reaches the reference value comprises:
   disposing a first current source, a second current source, and a third current source to charge a second capacitor to obtain the error signal at both ends of the second capacitor; and
   comparing the first sampling signal with the error signal and turning off the first switch tube when the first sampling signal reaches the error signal, wherein the first current source injects a current into the second capacitor, the second current source and the third current source extract a current from the second capacitor in a time-sharing manner, the second current source is controlled by a first feedback signal, and the third current source is controlled by a second feedback signal.

5. The constant-current control method according to claim 4, wherein the first feedback signal is the first sampling signal; and
   a method for obtaining the second feedback signal comprises:
   sampling and holding a peak value of the first sampling signal before the first switch tube is turned off to obtain a second sampling signal; and
   setting a gain coefficient to perform a gain processing on the second sampling signal to obtain the second feedback signal.

6. The constant-current control method according to claim 1, wherein a method for determining the zero crossing time of the excitation current comprises:
   performing a time integration on a predetermined parameter of the flyback converter during a turn-on of the first switch tube to obtain a first integration result; and
   performing a time integration on the predetermined parameter of the flyback converter after a turn-on of the second switch tube to obtain a second integration result, obtaining the zero crossing time of the excitation current when the second integration result reaches the first integration result, wherein
   the transformer comprises the primary winding, a secondary winding, and an auxiliary winding, and the predetermined parameter is voltage at both ends of one of the primary winding, the secondary winding, and the auxiliary winding in the transformer.

7. The constant-current control method according to claim 6, wherein the turning off the second switch tube after the zero crossing time of the excitation current in the resonant loop comprises:
   turning off the second switch tube in a preset time after the zero crossing time of the excitation current; or
   turning off the second switch tube when the excitation current reaches a preset negative value.

8. The constant-current control method according to claim 1, wherein a method for determining the zero crossing time of the excitation current comprises:
   charging a preset capacitor based on a current on an auxiliary winding in the transformer during a turn-on of the first switch tube; and
   discharging the preset capacitor based on the current on the auxiliary winding in the transformer after a turn-on of the second switch tube and obtaining the zero crossing time of the excitation current when the voltage at both ends of the preset capacitor is lower than a preset voltage.

9. The constant-current control method according to claim 8, wherein the turning off the second switch tube after the zero crossing time of the excitation current in the resonant loop comprises:
   turning off the second switch tube in a preset time after the zero crossing time of the excitation current; or
   turning off the second switch tube when the excitation current reaches a preset negative value.

10. The constant-current control method according to claim 1, further comprising:
    turning on the second switch tube after a first dead time, wherein the first switch tube is turned off during the first dead time; and
    turning on the first switch tube after a second dead time or when drain-source voltages of the first switch tube are lower than a preset voltage, wherein the second switch tube is turned off during the second dead time.

11. A flyback converter, comprising:
    a transformer with a primary winding and a secondary winding;
    a first switch tube and a second switch tube connected in series between an input terminal and a reference ground;
    a first inductor and a first capacitor connected to the primary winding and the second switch tube to form a resonant loop;
    a current sampling unit connected to the resonant loop and configured to sample a loop current in the resonant loop to obtain a first sampling signal;

a zero crossing detection unit configured to obtain a zero crossing time of an excitation current in the resonant loop; and a control circuit connected to control terminals of the first switch tube and the second switch tube and configured to control turn-on states of the first switch tube and the second switch tube, wherein the control circuit is connected to the current sampling unit and the zero crossing detection unit to turn off the first switch tube when the first sampling signal reaches a reference value and turn off the second switch tube after the zero crossing time of the excitation current to control an average value of the excitation current to keep constant.

12. The flyback converter according to claim 11, wherein the control circuit is further configured to turn on the second switch tube after a first dead time and turn on the first switch tube after a second dead time or when drain-source voltages of the first switch tube are lower than a preset voltage, the first switch tube is turned off during the first dead time, and the second switch tube is turned off during the second dead time.

13. The flyback converter according to claim 12, wherein the control circuit comprises:

a first turn-on triggering signal generating module configured to generate a turn-on triggering signal of the first switch tube based on the drain-source voltages of the first switch tube or to generate a turn-on triggering signal of the first switch tube based on a turn-off triggering signal of the second switch tube and the second dead time;

a first turn-off triggering signal generating module configured to generate a turn-off triggering signal of the first switch tube based on the first sampling signal and the reference value;

a second turn-on triggering signal generating module configured to generate a turn-on triggering signal of the second switch tube based on the turn-off triggering signal of the first switch tube and the first dead time; and a second turn-off triggering signal generating module configured to generate the turn-off triggering signal of the second switch tube based on the zero crossing time of the excitation current.

14. The flyback converter according to claim 13, wherein the reference value is an error signal generated according to a feedback of the loop current.

15. The flyback converter according to claim 14, wherein the first turn-off triggering signal generating module comprises:

an error signal generating unit configured to generate the error signal based on a first feedback signal and a second feedback signal; and a comparison unit comprising a normal-phase input terminal for receiving the error signal, a reverse-phase input terminal for receiving the first sampling signal, and an output terminal for outputting the turn-off triggering signal of the first switch tube.

16. The flyback converter according to claim 15, wherein the error signal generating unit comprises:

a first current source and a second capacitor connected between a power supply terminal and a ground terminal, wherein the first current source is configured to inject a current into an intermediate node between the first current source and the second capacitor;

a second current source and a first switch connected between the intermediate node and the ground terminal, wherein the second current source extracts a current from the intermediate node when the first switch is turned on;

a third current source and a second switch connected between the intermediate node and the ground terminal, wherein the third current source extracts a current from the intermediate node when the second switch is turned on;

a selection unit configured to generate, based on a control signal of the first switch tube and the zero crossing time of the excitation current, a first selection signal and a second selection signal inverted from each other, controlling the first switch to be turned on when the first selection signal is effective, and controlling the second switch to be turned on when the second selection signal is effective; and a feedback signal generating unit configured to generate the first feedback signal and the second feedback signal based on the first sampling signal; wherein the second current source is a voltage-controlled current source controlled by the first feedback signal, the third current source is a voltage-controlled current source controlled by the second feedback signal, and the first current source, the second current source, and the third current source jointly charge the second capacitor to generate the error signal at both ends of the second capacitor.

17. The flyback converter according to claim 16, wherein the feedback signal generating unit comprises:

a sampling and holding unit configured to sample and hold a peak value of the first sampling signal before the first switch tube is turned off to obtain a second sampling signal; and a voltage gain unit configured to perform a gain processing on the second sampling signal based on a gain coefficient to obtain the second feedback signal, wherein the first feedback signal is the first sampling signal sampled by the current sampling unit in real-time.

18. The flyback converter according to claim 11, wherein the reference value is a preset fixed value.

19. A lighting system, comprising:

a rectifying circuit configured to rectify an input alternating current (AC) power supply to output a first voltage signal;

a power factor correction (PFC) circuit connected to the rectifying circuit and configured to perform a PFC on the first voltage signal and output a second voltage signal; and the flyback converter according to claim 10 configured to drive a light-emitting diode (LED) load at a constant current.

20. The lighting system according to claim 19, wherein in the flyback converter, the control circuit is further configured to turn on the second switch tube after a first dead time and turn on the first switch tube after a second dead time or when drain-source voltages of the first switch tube are lower than a preset voltage, the first switch tube is turned off during the first dead time, and the second switch tube is turned off during the second dead time.

* * * * *